United States Patent
Howarth (10) Patent No.: US 9,631,555 B2
(45) Date of Patent: Apr. 25, 2017

(54) AIR INTAKE GUIDE (71) Applicant: ROLLS-ROYCE PLC, London (GB)

(72) Inventor: Nicholas Howarth, Derby (GB)

(73) Assignee: ROLLS-ROYCE plc, London (GB)

(*) Notice: Subject to any disclaimer, the term of this patent is extended or adjusted under 35 U.S.C. 154(b) by 432 days.

(21) Appl. No.: 14/221,936

(22) Filed: Mar. 21, 2014

(65) Prior Publication Data
US 2014/0311580 A1 Oct. 23, 2014

(30) Foreign Application Priority Data
Apr. 18, 2013 (GB) .................................. 1307004.0

(51) Int. Cl.
F02C 7/057 (2006.01)
F02C 7/042 (2006.01)

(52) U.S. Cl.
CPC .............. F02C 7/057 (2013.01); F02C 7/042 (2013.01); F05D 2220/80 (2013.01); F05D 2250/141 (2013.01); F05D 2260/407 (2013.01); F05D 2300/501 (2013.01); Y02T 50/672 (2013.01); Y10T 137/0379 (2015.04); Y10T 137/0536 (2015.04); Y10T 137/0645 (2015.04)

(58) Field of Classification Search
CPC .. F02C 7/057; F02C 9/16; F02C 7/042; F02C 7/045; F05D 2270/3011; F05D 2270/301; F05D 2220/80; Y10T 137/0645; Y10T 137/0536; Y10T 137/0379
See application file for complete search history.

(56) References Cited

U.S. PATENT DOCUMENTS

| 2,737,019 | A | | 3/1956 | Billman |
| 2,934,893 | A | | 5/1960 | Streeter |
| 3,032,977 | A | | 5/1962 | Neitzel |
| 3,181,818 | A | | 5/1965 | Pearl |
| 3,265,331 | A | | 8/1966 | Miles |
| 3,295,555 | A | * | 1/1967 | James ..................... F02C 7/042 138/45 |
| 3,447,325 | A | | 6/1969 | Tiley |

(Continued)

FOREIGN PATENT DOCUMENTS

| CA | 2 818 108 A1 | | 3/2013 |
| JP | 57041431 A | * | 3/1982 |
| JP | A-07-217449 | | 8/1995 |

OTHER PUBLICATIONS

Search Report issued in British Application No. 1307004.0 dated Oct. 4, 2013.

(Continued)

Primary Examiner — Jermie Cozart
(74) Attorney, Agent, or Firm — Oliff PLC (57) ABSTRACT An air intake guide for a jet propulsion power plant for a supersonic aircraft comprises an intake aperture, an intake center body and an intake adjustment device. The intake aperture has an intake lip, an intake center body is positioned within the aperture, and an intake adjustment device is positioned on a radially inwardly facing surface of the air intake guide downstream of the intake lip. The intake adjustment device comprises a flexible panel and an actuator with the actuator being adapted to deflect the flexible panel in a radially inwardly direction so as to reduce a cross-sectional area of the intake aperture and thereby to position a shock wave at the intake lip.

11 Claims, 7 Drawing Sheets (56) References Cited

U.S. PATENT DOCUMENTS

| 5,971,000 A | 10/1999 | Koncsek et al. |
| 2002/0117581 A1 | 8/2002 | Sanders et al. |
| 2009/0013862 A1 | 1/2009 | Schlipf et al. |

OTHER PUBLICATIONS

European Search Report issued in European Patent Application No. 14 16 1039 on Aug. 12, 2014.

\* cited by examiner

Fig.7
Supersonic Pitot Intake - Subcritical Operation

AIR INTAKE GUIDE

This invention claims the benefit of UK Patent Application No. 1307004.0, filed on 18 Apr. 2013, which is hereby incorporated herein in its entirety.

FIELD OF THE INVENTION

The present invention relates to a supersonic air intake duct and particularly, but not exclusively, to a supersonic air intake duct for a gas turbine engine, together with a method for controlling such a duct.

BACKGROUND TO THE INVENTION

In a conventional jet engine powered aircraft, an engine system is fed with intake air supplied through a forward-facing air intake. This air is then mixed with a fuel, the mixture combusted and the resultant exhaust gases are used to provide propulsion of the aircraft.

It is well known that the geometric shape of the air intake is important in ensuring efficient operation of the engine system. This is particularly important when the aircraft is travelling faster than the speed of sound in air.

Flight conditions vary considerably from take-off and subsonic flight through transonic and low Mach number supersonic flight to high Mach number supersonic flight. Consequently as flight conditions change, the geometry of the air intake is ideally varied in order to ensure that the intake air mass flow is matched to that required by the propulsion engine or engines. Such variation ensures that the air intake is running full, thereby to obtain optimum efficiency of operation as flight conditions change.

For flight at high supersonic Mach numbers the intake structure is such as to produce a plurality of shock waves ahead of an intake lip forming part of the boundary of the intake aperture, and the requirement for optimum installed engine efficiency is that the last of the shock waves (which is termed the "normal shock wave") each of which forms a consecutive compression stage, is kept on the intake lip. If the normal shock wave enters the intake passage, a loss of efficiency occurs. Conversely, if the normal shock wave is too far ahead of the intake lip, air spillage occurs round the intake lip causing spillage drag.

Spillage drag, as the name implies, occurs when an inlet "spills" air around the outside of the intake lip instead of transferring the air to the engine's compressor. The amount of air that goes through the inlet is set by the engine and can change with altitude and throttle setting. The inlet is usually sized to pass the maximum airflow that the engine can ever demand and, for all other conditions, the inlet will spill the difference between the actual engine airflow and the maximum air demanded.

Current practice for medium supersonic Mach number intakes ($M\approx1.5$ to 2) with external supersonic to subsonic shock diffusion systems is to operate with a final normal shock in front of the intake lip. This is achieved by oversizing the inlet. This provides a stability margin with a low risk of aerodynamic disturbance to the power plant. This approach has a disadvantage that a percentage of the flow is spilled around the intake lip with consequent spillage drag. If the intake was sized to eliminate spillage by allowing the shock wave to sit inside the intake there is a risk of aerodynamic instability causing the shock wave to jump in and out of the intake thus disturbing the turbo machinery.

Some form of variable intake is needed if an oversized fixed intake is not employed. Variable intake schemes already devised are either more suited to higher Mach number engines, having larger, slow moving mechanical flaps and/or tend to be rectangular in section and thus more suited to fuselage mounted engines.

Alternatively, for an axi-symmetric intake having a conical centre body, the variable intake arrangement could be realised by axially displacing the centre body itself. However, for intermediate Mach numbers the cost and weight implications of such an approach relative to the benefits are prohibitive.

STATEMENTS OF INVENTION

According to a first aspect of the present invention there is provided an air intake guide for a jet propulsion power plant for a supersonic aircraft, the air intake guide comprising:

an intake aperture having an intake lip; and an intake adjustment device positioned on a radially inwardly facing surface of the air intake guide downstream of the intake lip,     wherein the intake adjustment device comprises a flexible panel and an actuator, the actuator being adapted to deflect the flexible panel in a radially inwardly direction so as to reduce a cross-sectional area of the intake aperture.

The air intake guide of the invention is capable of controlling the position of the shock wave outside the intake by actively varying the area in the intake duct downstream of the intake lip. This minimises spillage drag and thereby optimises the efficiency of the intake.

The air intake guide of the invention achieves the variation in area at the outer wall of the intake duct itself, internal to the intake lip. Such a system requires only small changes to the effective radius within the intake duct to bring about a given area change and so to influence shock wave position. This in turn makes the air intake guide compact, lightweight and highly suited to engines having circular intake arrangements. Such engines are favoured for medium supersonic ($M\approx1.5$ to 2) applications.

Optionally, the air intake guide further comprises an intake centre body positioned within the aperture.

Optionally, the intake aperture is circular in cross-section.

An intake aperture of circular cross-section means that the radially inward deflection of the flexible panel may be easier and more convenient to implement. This is because the inward deflection can be uniform around the inner periphery of the intake aperture. This makes the air intake guide of the present invention simpler and cheaper to produce and hence more convenient for a user.

Optionally, the air intake guide further comprises a flexible fairing positioned downstream of, and contiguous with, the flexible panel.

In order to maintain the efficiency of the engine it is necessary to ensure that the inner surfaces of the engine that are washed by the intake air are contiguous and streamlined.

In one embodiment of the invention, in order to produce a radially inward deflection of the flexible panel it is necessary to accommodate a translation of one edge (in this case, the downstream edge) of the flexible panel. This results in a gap between the downstream edge of the flexible panel and the adjacent inner surface of the engine.

In order to prevent this gap producing aerodynamic drag and the resulting reduction in efficiency, a flexible fairing is employed to cover any gap resulting from the operation of the intake adjustment device.

Optionally, the actuator is one or more of a hydraulic, pneumatic, electric and piezo-electric actuator.

Any suitable means of producing a radially inward deflection of the flexible panel may be used.

In one arrangement, the actuator is an electro-mechanical actuator in the form of a tensioned cable that acts in a radially inward direction and directly on the radially outward surface of the flexible panel.

In another arrangement, the actuator is a radial array of piezo-electric actuators that is arranged around the circumference of the intake duct and that each act in an axial direction by pressing against an edge of the flexible panel thus causing the panel to deflect inward by bowing inwardly.

Optionally, the actuator comprises a first, high rate response actuator and a second, low rate response actuator.

The use of multiple actuators having different response rates provides for both slow, steady-state bulk deflections and high speed small deflections. The term 'rate response' is used to mean the speed with which the actuator can respond to an actuation signal and produce a mechanical output.

The slow, steady-state deflections allow larger improved overall matching around the flight envelope of the aircraft. The high speed small deflections allow high rate tuning of the shock wave position to be superimposed on the slow, steady state bulk deflection in order to minimise the aerodynamic drag of the intake adjustment device.

Optionally, the actuator provides a radially inwardly directed force on the flexible panel.

The use of a radially inwardly acting actuator requires lower actuating forces for a given deflection of the flexible panel than an axially configured actuator. However, this arrangement requires a greater radial clearance within the engine assembly due to the radial arrangement of the actuators.

Optionally, the actuator provides an axially directed force on the flexible panel.

An actuator that is configured to act in the axial direction requires higher actuating forces for a given deflection of the flexible panel than a radially configured actuator. Such an axially arranged actuator requires less radial clearance and may therefore be more easily and conveniently incorporated into the engine assembly than a radially configured actuator.

Optionally, the air intake guide further comprises a slipper interposed between the actuator and the flexible panel, the slipper comprising first ramp surface, the flexible panel comprising a second ramp surface, the first and second ramp surfaces being in sliding contact with one another, wherein axial movement of the actuator causes a corresponding radially inward movement of the flexible panel.

The slipper enables an axial movement of the actuator to be readily converted into a corresponding radial movement of the flexible panel.

Optionally, the air intake guide further comprises one or more pressure sensors positioned on a radially inwardly facing surface of the intake lip.

Optionally, the air intake guide further comprises one or more pressure sensors positioned on a radially outwardly facing surface of the intake lip.

Optionally, the flexible panel is formed from an elastomeric material.

It is necessary for the flexible panel to readily deflect inwards in response to either a radial deflection of its inner surface or an axial deflection of an edge. This requires the flexible panel to be formed from a material that is readily deformable.

In one arrangement, the flexible panel is formed from a thin sheet of spring steel having a thickness of approximately 0.2 mm. In other arrangements, the flexible panel may be formed from other metal alloys such as a titanium alloy.

Optionally, the flexible panel is formed from a fibre-reinforced composite material.

In alternative arrangements, the flexible panel may be formed from a fibre reinforced composite material. In such a panel, the orientation of the reinforcing fibres may be predominantly aligned with a longitudinal axis of the engine to thereby accommodate circumferential contraction of the panel as it is deflected radially inwardly.

In further alternative arrangements, the flexible panel may be formed from an auxetic material to thereby promote circumferential contraction of the panel as it is deflected radially inwardly.

According to a second aspect of the present invention there is provided a method of controlling the position of a shock wave generated at the intake lip of an air intake guide of an engine in a supersonic aircraft, the air intake guide comprising an intake aperture comprising an intake lip, an intake centre body positioned within the aperture and an intake adjustment device positioned on a radially inwardly facing surface of the air intake guide downstream of the intake lip, the intake adjustment device comprising a flexible panel and an actuator, the method comprising the steps of:

sensing pressure at one or more first sensing positions distributed circumferentially around the intake lip;

determining the position of the shock wave relative to the aperture and intake lip based on the sensed pressure(s); and if the shock wave is not positioned at a pre-determined position relative to the intake lip, transmitting an actuation signal to the actuator to deflect the flexible panel in a radial direction relative to the aperture to thereby return the shock wave to the pre-determined position.

Control of the actuators is based on the measurement of pressure at radially inner and radially outer surfaces of the intake lip and also at a radially inner surface downstream of the air intake guide. These pressure measurements are used to determine the position of the shock wave once the aircraft is travelling within a supersonic flight regime.

The pressure data is then analysed by the engine control system in conjunction with engine operating data to determine the operating strategy for the movement of the actuator in the air intake adjustment device.

In the method of the present invention, a position for the shock wave relative to the intake lip is pre-determined for each particular flight condition. This pre-determined position provides for an optimum balance between protecting the engine from shock ingestion whilst at the same time minimising spillage drag.

Optionally, the one or more first sensing positions are distributed over a radially inwardly facing surface of the intake lip.

By monitoring the pressures along the radially inwardly facing surface of the intake lip it possible to detect if during the supersonic flight regime the shock wave enters the intake duct. Once this is detected, the intake adjustment device may be activated to move the shock wave out of the intake duct to the intake lip.

Optionally, the one or more first sensing positions are distributed over a radially outwardly facing surface of the intake lip.

If the shock wave moves too far forward of the intake lip, i.e. upstream of the intake aperture, this may result in spillage drag thus reducing the efficiency of the engine.

Optionally, the step of:
    sensing pressure at one or more first sensing positions distributed circumferentially around the intake lip, comprises the additional step of:
    sensing pressure at one or more second sensing positions distributed circumferentially around a radially inwardly facing surface downstream of the air intake guide.

According to a third aspect of the present invention there is provided a computer implemented method of controlling the position of a shock wave generated at the intake lip of an air intake guide of an engine in a supersonic aircraft, comprising:
    a computer program having instructions adapted to carry out the method as claimed in any one of claims 11 to 14; and
    a computer readable medium having the computer program recorded thereon, wherein the computer program is adapted to make a computer execute the method.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
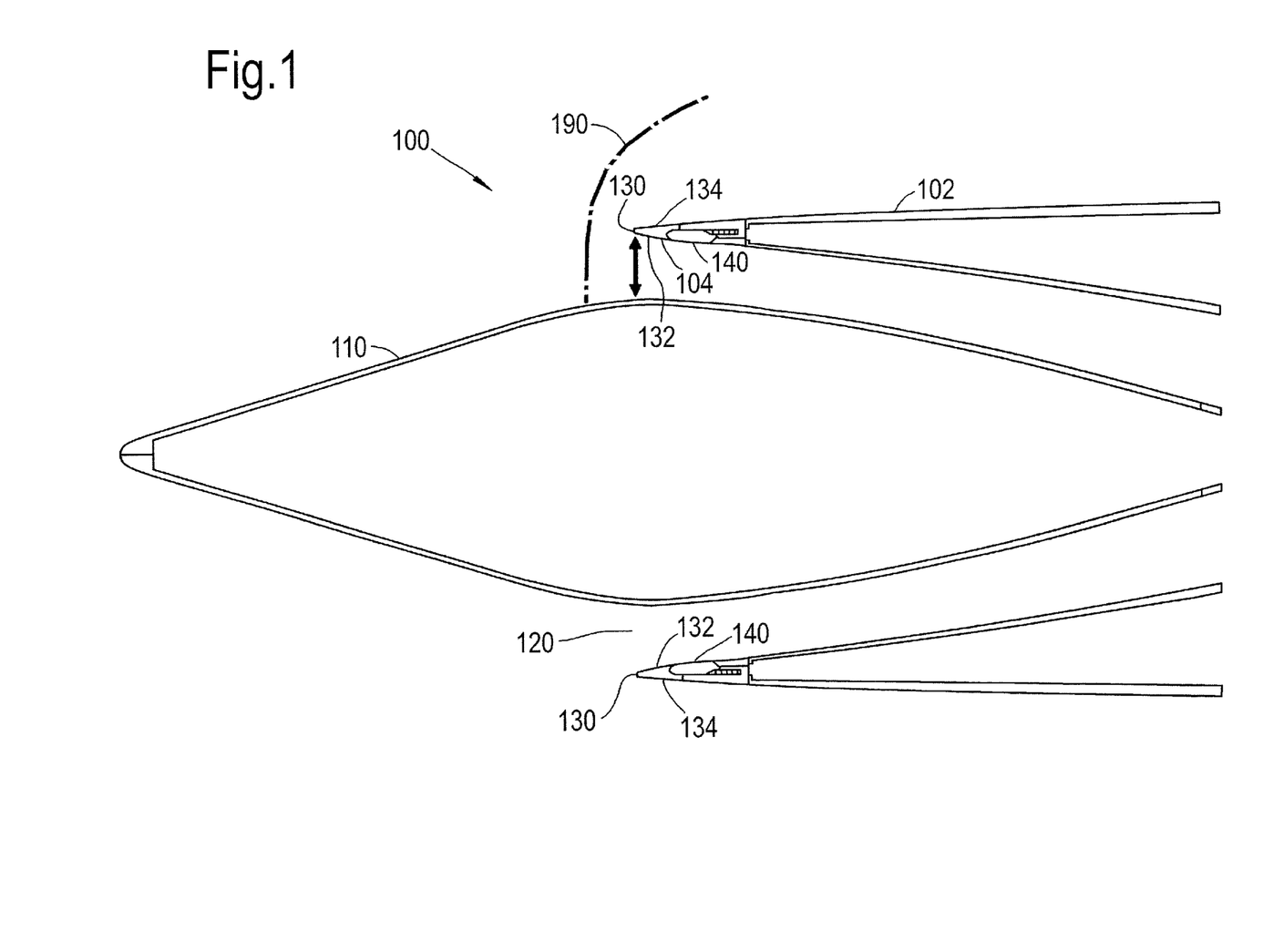
FIG. 1 shows a schematic partial sectional view of a jet engine having an air intake guide according to a first embodiment of the invention.
Figure 2:
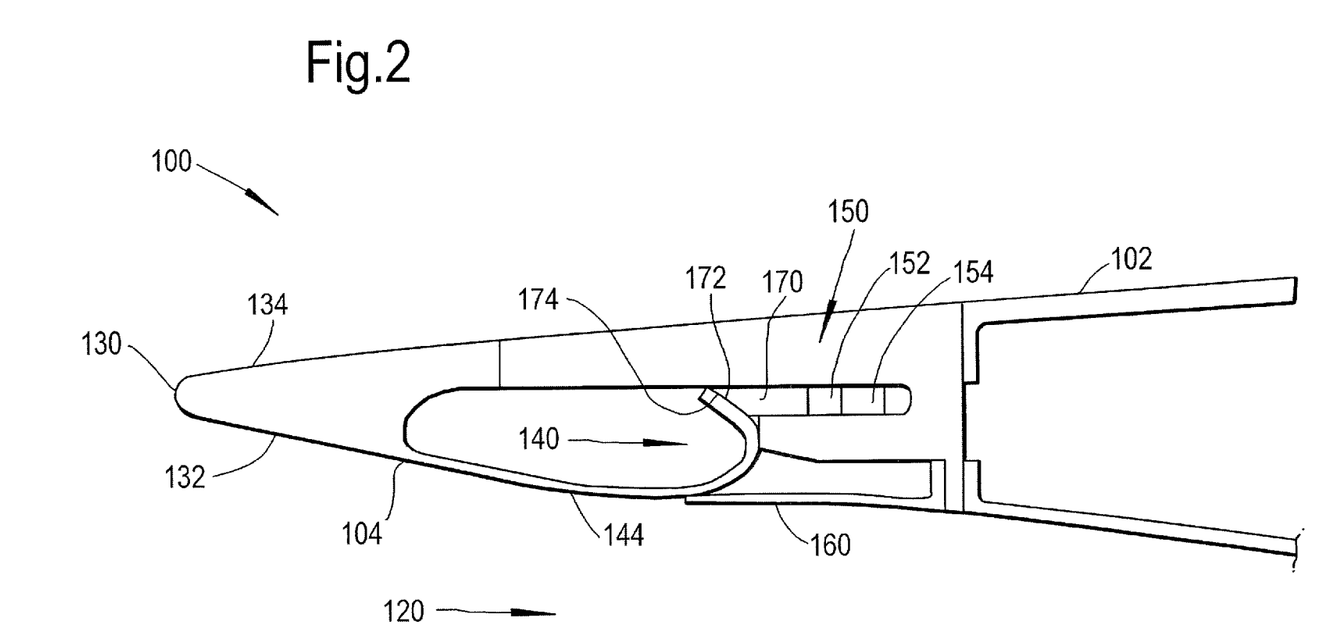
FIG. 2 shows a schematic partial sectional view of the air intake guide of FIG. 1, in its inactive position.
Figure 3:
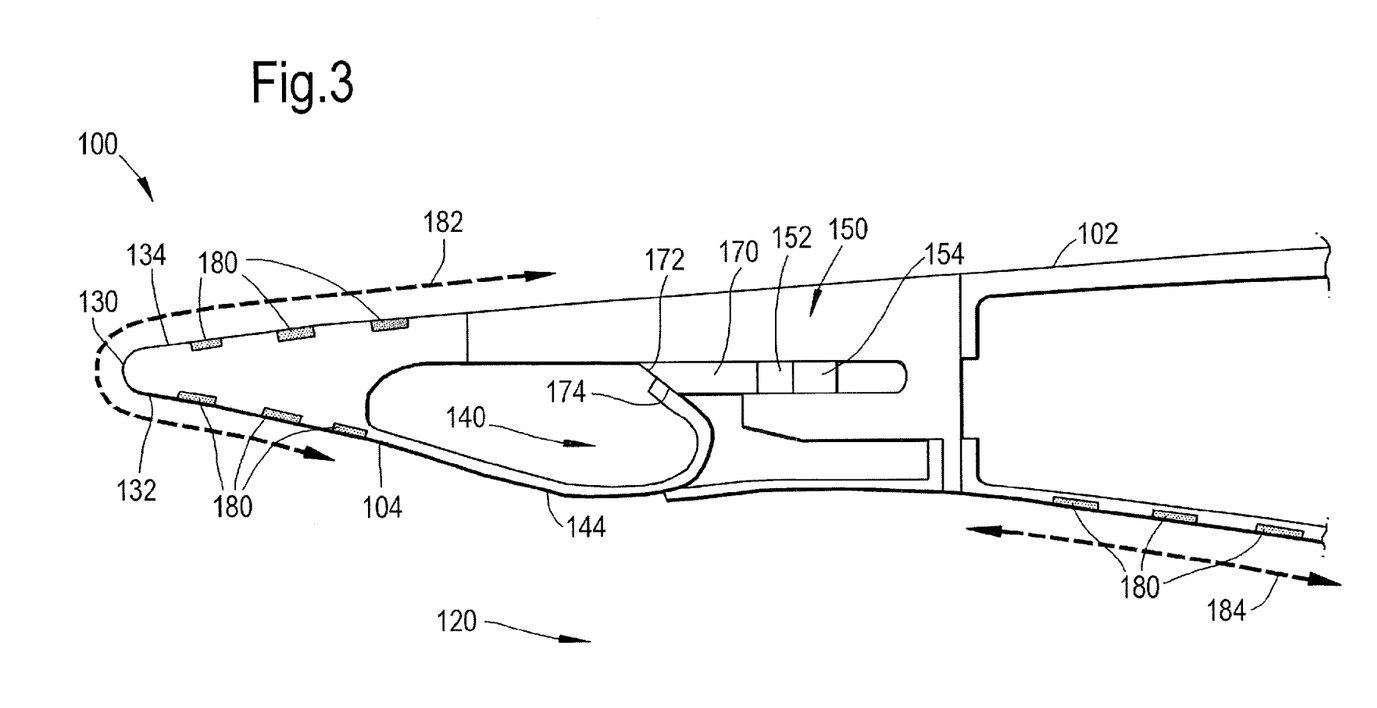
FIG. 3 shows a schematic partial sectional view of the air intake guide of FIG. 1, in its activated position.

Referring to FIGS. 1 to 3, an air intake guide according to a first embodiment of the invention is designated generally by the reference numeral 100. The air intake guide 100 is positioned at the air inlet, or air intake, of the nacelle 102 of a jet propulsion power plant (not shown) for a supersonic aircraft (also not shown).

In the following disclosure, the following definitions are adopted. The terms 'upstream' and 'downstream' are considered to be relative to the air flow through the engine, which in all of the figures is from left to right. The term 'radially inwardly' is considered to relate to a direction relative to the axis of the engine and corresponds to a downward direction in each of FIGS. 1 to 4. The terms 'axial' and axially' are considered to relate to the direction of the axis of the engine, which in all of the figures is from left to right.

The air intake guide 100 comprises an intake aperture 120 having an intake lip 130, and an intake adjustment device 140 positioned on a radially inwardly facing surface 104 of the air intake guide 100 and downstream of the intake lip 130.

The intake lip 130 encircles and thereby defines the intake aperture 120. In the present embodiment, the intake aperture 120 is circular. However, in other embodiments of the invention the intake aperture may take other geometric forms such as, for example, an ellipse or an oval.

In the present embodiment, an intake centre body 110 is positioned within the intake aperture 120. The function of the intake centre body 110 is to generate a system of shock waves 190 and so to optimise the efficiency of the intake of air into the engine.

The intake lip 130 has a radially inwardly facing surface 132 and a radially outwardly facing surface 134. A plurality of pressure sensors 180 are provided in each of the inwardly and outwardly facing surfaces 132,134, at first sensing positions represented by arrow 182 in FIG. 3.

Additionally, further pressure sensors 180 are provided at second sensing positions represented by arrow 184 in FIG. 3. The second sensing positions are arranged on a radially inwardly facing surface of the nacelle 102 downstream of the air intake guide.

The intake adjustment device 140 comprises a flexible panel 144 and an actuator 150 configured to press against the flexible panel 144 and so to deflect the flexible panel 144 in a radially inwardly direction.

The flexible panel 144 is formed as an annular ring and projects into the intake aperture 120. The above-mentioned deflection of the flexible panel 144 results in a cross-sectional area of the intake aperture 120 being reduced.

In the present embodiment, the flexible panel 144 is formed from a thin sheet of spring steel. In alternative arrangements, the flexible panel 144 may be provided with thin slots in its surface to increase the range of deflection.

In the present embodiment of the invention, the actuator 150 comprises a first, high rate response actuator 152 and a second, low rate response actuator 154 arranged in series with one another. In other words, the second actuator 154 is configured to provide an axial force against the first actuator 152.

The second, low rate response actuator 154 is arranged to provide a slow, steady state axial force while the first, high rate response actuator 152 provides for a rapidly variable "tuning" axial force to supplement the steady state force provided by the second actuator 154.

The first actuator 152 and the second actuator 154 are each formed as a plurality of individual piezo-electric actuating elements (not shown) that are uniformly circumferentially distributed around a circumference of the air intake guide 100.

In other embodiments of the invention, the second actuator 154 may take the form of memory metal alloys, hydraulic, electro-hydraulic or electro-mechanical means. Similarly, in other arrangements, the first actuator 152 may comprise hydraulic, electro-hydraulic or electro-mechanical means.

A slipper 170 is interposed between the first actuator 152 and the flexible panel 144. The first actuator 152 therefore exerts an axial force against the slipper 170. The slipper 170 comprises a first ramp surface 172 which is configured to transmit the axial force to the flexible panel 144.

The flexible panel 144 is formed in a hook or "U" shape. A first leg of the "U" forms the radially inwardly facing surface 104 of the air intake guide 100 and extends upstream to join the radially inwardly facing surface 132 of the intake lip 130. A second leg of the "U" is provided with a second ramp surface 174 which slidingly contacts the first ramp surface 172 of the slipper 170 to thereby receive the axial force generated by the first and second actuators 152,154.

Figure 4:
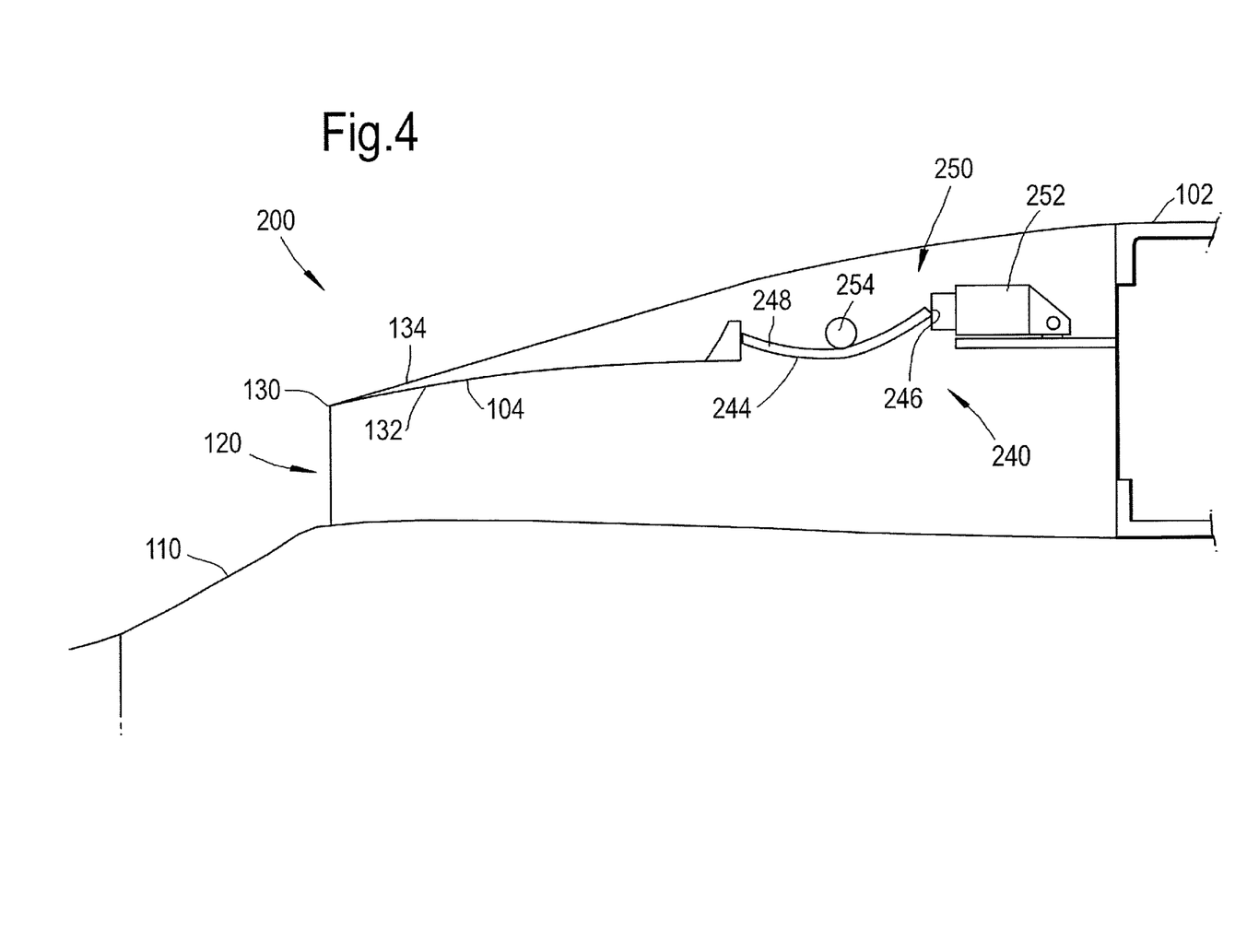
FIG. 4 shows schematic partial sectional view of an air intake guide according to a second embodiment of the invention.

Referring to FIG. 4, an air intake guide according to a second embodiment of the invention is designated generally by the reference numeral 200. Features of the air intake guide 200 which correspond to those of apparatus 100 have been given corresponding reference numerals for ease of reference.

In this second embodiment, the intake adjustment device 240 comprises a flexible panel 244 and an actuator 250 configured to press against the flexible panel 244 and thereby to deflect the flexible panel 244 in a radially inwardly direction The actuator 250 comprises a first, high rate response actuator 252 and a second, low rate response actuator 254.

The first actuator 252 is an electro-mechanical actuator and presses in an axial direction against an edge 246 of the flexible panel 244 thereby causing the flexible panel 244 to bow and thereby deflect in a radially inwardly direction. The second actuator 254 is an electro-mechanical actuator and presses in a radially inward direction against a radially outwardly facing surface 248 of the flexible panel 244.

In other arrangements of the second embodiment, the second actuator 254 may comprise a electro-hydraulic actuator, for example using a circumferentially arranged cable which may be variably tensioned.

In use, pressure measurements are taken from the pressure sensors 180 and transmitted to the engine control unit (ECU). The ECU (not shown) uses this data together with other information relating to the engine's operating condition and the aircraft's flight envelope to determine an actuation strategy for the actuator 150; 250.

Figure 5:
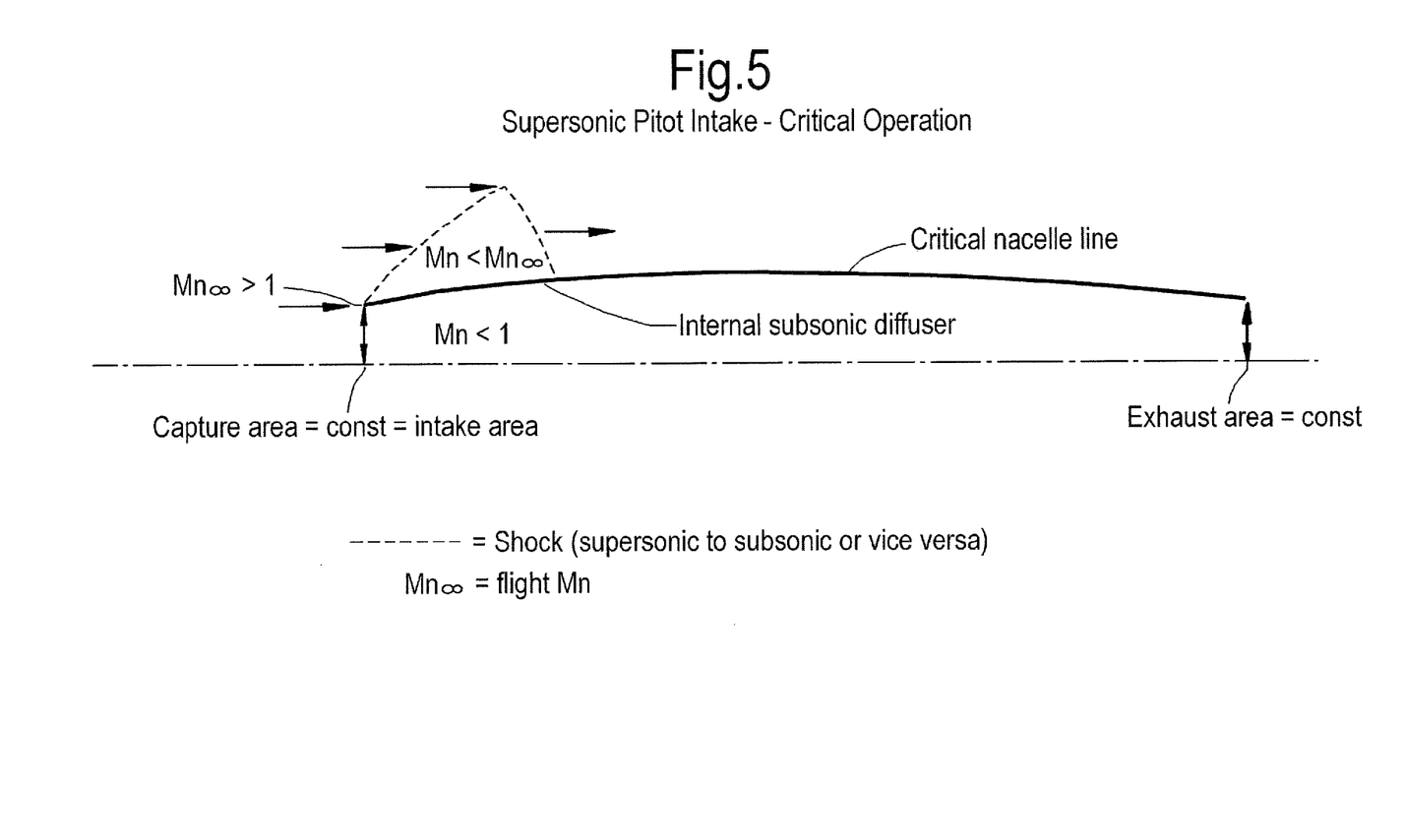
FIG. 5 shows a schematic arrangement of an engine of a supersonic aircraft in a critical shock arrangement.

FIG. 5 shows the ideal scenario which facilitates a minimum (critical) size nacelle and thus minimum drag. The shock is axially aligned with the intake lip which is an unstable scenario with a high risk of shock ingestion into the engine.

Figure 6:
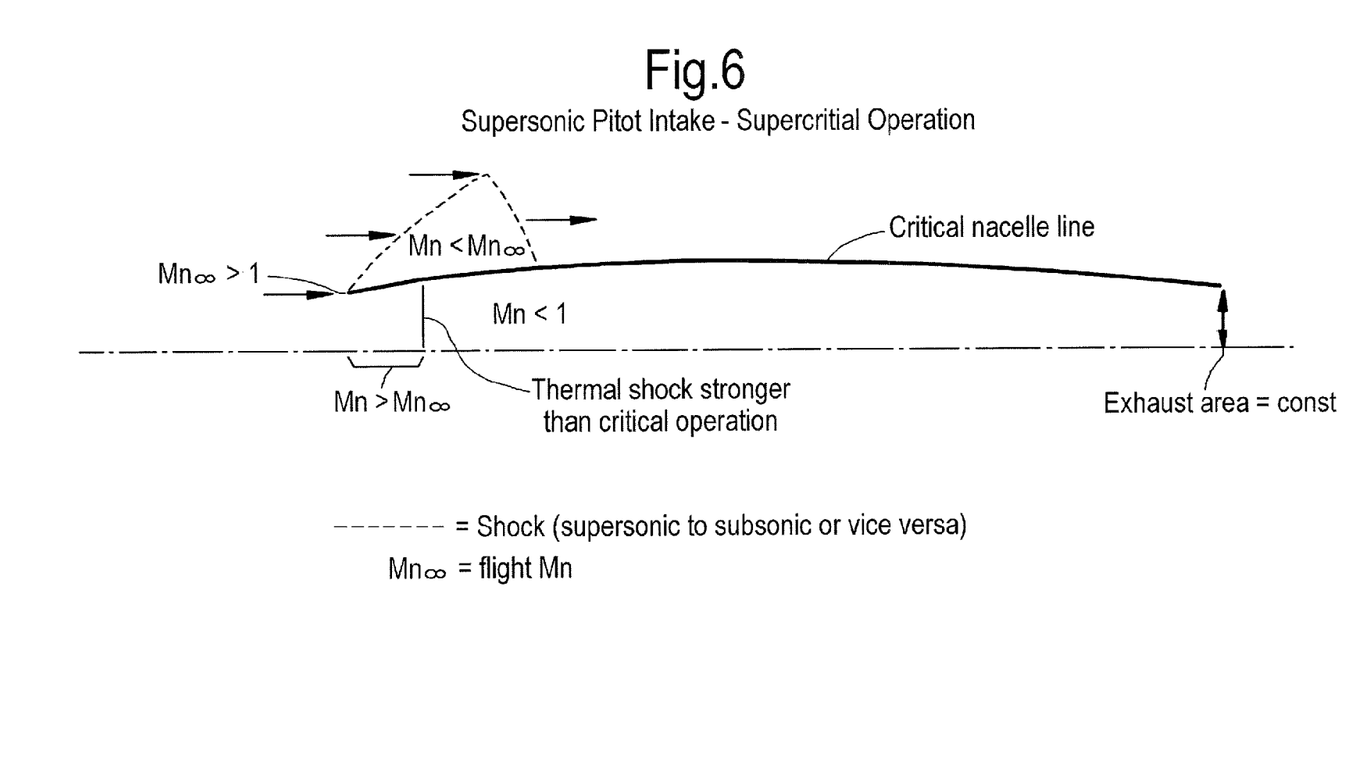
FIG. 6 shows a schematic arrangement of the engine of FIG. 5 in a supercritical operation.
Figure 7:
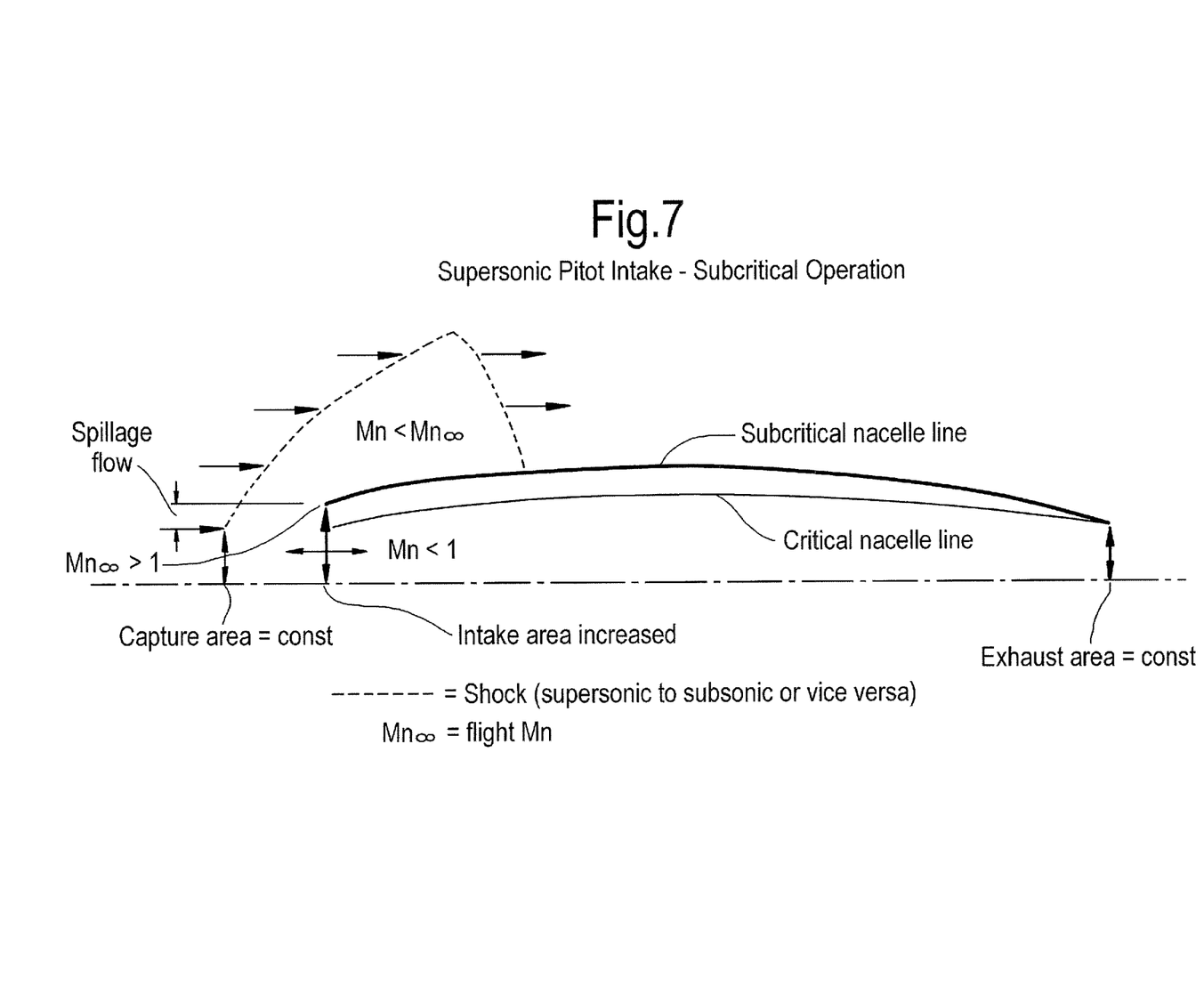
FIG. 7 shows a schematic arrangement of the engine of FIG. 5 in a subcritical operation.

With reference to FIG. 6, if the shock is ingested into the intake aperture 120, then the flow will accelerate in the diverging section of the intake normally provided for subsonic diffusion to the first compressor and will thus accelerate to exceed the flight Mach number (i.e. the Mach number corresponding to the aircraft's speed). This will result in a higher pressure ratio terminal shock with increased pressure loss and a risk of the engine entering a compressor surge condition. This reduces the efficiency of the engine and may cause damage to the engine.

The actuation strategy is intended to actively respond to variations in the flow presented to the intake that would have otherwise caused shock ingestion. The present invention thus allows a design of engine and nacelle to approach the ideal scenario in FIG. 5 closer than is currently possible with a passive fixed structure. Operation of the engine with the shock wave 190 at this closer position minimises the aerodynamic drag and so maximises the efficiency of the installed engine.

If the shock moves too close to the intake as determined by processing pressure data from sensors 180 (thus threatening shock ingestion and supercritical operation) the actuator 150; 250 will be actuated by the ECU and will deflect the flexible panel 144; 244 radially inwardly to thereby constrict the flow through the intake aperture 120. This causes the shock wave 190 to move away from the intake lip 130.

The active nature of the air intake guide of the present invention allows subcritcal operation to be maintained at smaller nacelle diameters than is currently possible. This corresponds to a shock system lying closer to the intake lip 130 than currently possible for a passive intake The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. An air intake guide for a jet propulsion power plant for a supersonic aircraft, the air intake guide comprising:
   an intake aperture having an intake lip; and
   an intake adjustment device positioned on a radially inwardly facing surface of the air intake guide downstream of the intake lip,
   wherein the intake adjustment device comprises a flexible panel and an actuator, the actuator being adapted to deflect the flexible panel in a radially inwardly direction so as to reduce a cross-sectional area of the intake aperture,
   wherein the air intake guide further comprises a flexible fairing positioned downstream of, and contiguous with, the flexible panel, and
   wherein the actuator comprises a first, high rate response actuator and a second, low rate response actuator.

2. The air intake guide as claimed in claim 1, further comprising an intake center body positioned within the aperture.

3. The air intake guide as claimed in claim 1, wherein the intake aperture is circular in cross-section.

4. The air intake guide as claimed in claim 1, wherein the actuator is one or more of a hydraulic, pneumatic, electric and piezo-electric actuator.

5. The air intake guide as claimed in claim 1, wherein the actuator provides a radially inwardly directed force on the flexible panel.

6. The air intake guide as claimed in claim 1, wherein the actuator provides an axially directed force on the flexible panel.

7. The air intake guide as claimed in claim 6, further comprising a slipper interposed between the actuator and the flexible panel, the slipper comprising a first ramp surface, the flexible panel comprising a second ramp surface, the first and second ramp surfaces being in sliding contact with one another, wherein axial movement of the actuator causes a corresponding radially inward movement of the flexible panel.

8. The air intake guide as claimed in claim 1, further comprising one or more pressure sensors positioned on a radially inwardly facing surface of the intake lip.

9. The air intake guide as claimed in claim 1, further comprising one or more pressure sensors positioned on a radially outwardly facing surface of the intake lip.

10. The air intake guide as claimed in claim 1, wherein the flexible panel is formed from an elastomeric material.

11. The air intake guide as claimed in claim 1, wherein the flexible panel is formed from a fibre-reinforced composite material.

* * * * *